(12) United States Patent
Pollack et al.

(10) Patent No.: US 8,450,238 B2
(45) Date of Patent: *May 28, 2013

(54) SORBENT FORMULATION FOR REMOVAL OF MERCURY FROM FLUE GAS

(75) Inventors: Nicholas R. Pollack, Moon, PA (US); Richard A. Hayden, Pittsburgh, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,088

(22) Filed: Jun. 6, 2012

(65) Prior Publication Data

US 2012/0244355 A1 Sep. 27, 2012

Related U.S. Application Data

(63) Continuation of application No. 12/892,866, filed on Sep. 28, 2010, now Pat. No. 8,216,535.

(60) Provisional application No. 61/246,402, filed on Sep. 28, 2009, provisional application No. 61/246,398, filed on Sep. 28, 2009, provisional application No. 61/349,332, filed on May 28, 2010.

(51) Int. Cl.
*B01J 20/00* (2006.01)
*B01J 20/10* (2006.01)
*B01J 20/16* (2006.01)
*B01J 20/20* (2006.01)
*C09K 3/00* (2006.01)

(52) U.S. Cl.
USPC ........... 502/400; 502/407; 502/413; 502/414; 502/416; 502/417; 423/210

(58) Field of Classification Search
USPC ............... 423/210; 502/400, 416, 407, 413, 502/414, 417; 252/182.32, 182.34, 183.11
See application file for complete search history.

(56) References Cited

U.S. PATENT DOCUMENTS

| | | | |
|---|---|---|---|
| 3,961,020 A | 6/1976 | Seki | |
| 4,174,373 A | 11/1979 | Yoshida et al. | |
| 4,215,096 A | 7/1980 | Sinha et al. | |
| 6,126,910 A | 10/2000 | Wilhelm et al. | |
| 6,238,641 B1 | 5/2001 | Hayden | |
| 6,514,906 B1 | 2/2003 | Hayden | |
| 6,803,025 B2 | 10/2004 | Meserole et al. | |
| 7,722,843 B1 * | 5/2010 | Srinivasachar | ............... 423/210 |
| 2005/0019240 A1 | 1/2005 | Lu et al. | |
| 2007/0041885 A1 | 2/2007 | Maziuk, Jr. | |
| 2007/0207923 A1 | 9/2007 | Lu et al. | |
| 2007/0219404 A1 | 9/2007 | Matthews | |
| 2007/0231230 A1 | 10/2007 | Meserole et al. | |
| 2008/0182747 A1 | 7/2008 | Sinha | |
| 2009/0056538 A1 | 3/2009 | Srinivasachar et al. | |
| 2009/0081092 A1 | 3/2009 | Yang et al. | |
| 2009/0136401 A1 | 5/2009 | Yang et al. | |

OTHER PUBLICATIONS

Campbell, et al., Mercury Control with Activated Carbon: Results from Plants with High $SO_3$, Paper #08-A-174-Mega-AWMA, pp. 1-17; Proceedings from the 2008 Power Plant Pollution Control "MEGA" Symposium, Aug. 25-28, 2008, Baltimore, Maryland.

Jarvis, et al., $SO_3$ Removal as a Mercury Control Strategy: Reducing $SO_3$ helps control mercury emissions and can boost plant efficiency and decrease operating costs, *Power Industry Services* (2008), 1-9.

Looney, et al., Activated Carbon Injection with $SO_3$ Flue Gas Conditioning Test at Gulf Power's Mercury Research Center, Paper #78, pp. 1-7; Proceedings from the 2008 Power Plant Pollution Control "MEGA" Symposium, Aug. 25-28, 2008, Baltimore, Maryland.

Macías-Pérez, et al., $SO_2$ retention on CaO/activated carbon sorbents. Part II: Effect of the activated carbon support, *Fuel* (Feb. 20, 2008), 87(12):2544-2550.

Presto, et al., Further Investigation of the Impact of Sulfur Oxides on Mercury Capture by Activated Carbon, *Ind. Eng. Chem. Res.* (Nov. 2, 2007), 46(24):8273-8276.

Presto, et al., Impact of Sulfur Oxides on Mercury Capture by Activated Carbon, *Environ Sci Technol.* (Sep. 15, 2007), 41(18):6579-6584.

* cited by examiner

*Primary Examiner* — Timothy Vanoy
(74) *Attorney, Agent, or Firm* — Pepper Hamilton LLP

(57) ABSTRACT

Methods and systems for reducing mercury emissions from fluid streams having a high concentration of sulfur oxide species are provided herein. In embodiments, mercury is removed from flue gas streams by injecting a dry admixture of a porous mercury adsorptive material and at least one dry agent into the flue gas stream.

48 Claims, No Drawings

SORBENT FORMULATION FOR REMOVAL OF MERCURY FROM FLUE GAS

CROSS-REFERENCE TO RELATED APPLICATIONS

This application is a continuation of U.S. patent Ser. No. 12/892,866 filed Sep. 28, 2010, now U.S. Pat. No. 8,216,535, issued Jul. 10, 2012, entitled "Sorbent Formulation for Removal of Mercury From Flue Gas", which claims benefit of priority to U.S. Provisional Patent Application No. 61/246,402 filed on Sep. 28, 2009 entitled "Sulfur-Tolerant Sorbent Compositions For Mercury Removal From Flue Gas," U.S. Provisional Patent Application No. 61/246,398 filed on Sep. 28, 2009 entitled "Novel Carbon Based Sorbents for High $SO_3$ Applications," and U.S. Provisional Patent Application No. 61/349,332 filed on May 28, 2010 entitled "Sulfur-Tolerant Sorbent Compositions For Mercury Removal From Flue Gas," the entire contents of which are hereby incorporated by reference.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Mercury is a known environmental hazard and leads to health problems for both humans and non-human animal species. Approximately 50 tons per year are released into the atmosphere in the United States, and a significant fraction of the release comes from emissions from coal burning facilities such as electric utilities. To safeguard the health of the public and to protect the environment, the utility industry is continuing to develop, test, and implement systems to reduce the level of mercury emissions from its plants. In the combustion of carbonaceous materials, it is desirable to have a process wherein mercury and other undesirable compounds are captured and retained after the combustion phase so that they are not released into the atmosphere.

One of the most promising solutions for mercury removal from flue gas is Activated Carbon Injection (ACI). Activated carbon is a highly porous, non-toxic, readily available material that has a high affinity for mercury vapor. This technology is already established for use with municipal incinerators. Although the ACI technology is effective for mercury removal, the short contact time between the activated carbon and the flue gas stream results in an inefficient use of the full adsorption capacity of the activated carbon. Mercury is adsorbed while the carbon is conveyed in the flue gas stream along with fly ash from the boiler. The carbon and fly ash are then removed by a particulate capture device such as an Electrostatic Precipitator (ESP) or baghouse.

In flue gas streams containing high concentrations of sulfur oxides, mercury removal by the injection of activated carbon is often compromised by the preferential adsorption and retention of the sulfur compounds such as sulfur trioxide, which are strongly adsorbed by carbon sorbents. The concentration of sulfur dioxide relative to mercury in a typical flue gas stream can be one million to one or higher, and the concentration of sulfur trioxide in such flue gas streams are typically one thousand to one. For example, high sulfur flue gas streams may contain from about 500 parts-per million per volume (ppmv) to about 2500 ppmv or more sulfur dioxide and from about 2 ppmv to about 20 ppmv or more sulfur trioxide. Water vapor in the flue gas further compounds the problem by combining with sulfur trioxide to form sulfuric acid in the pores of the carbon, effectively excluding the adsorption and removal of mercury. For utilities that burn bituminous coals or mixtures of bituminous coals with lower rank sub-bituminous coals, the presence of high levels of sulfur oxides, especially sulfur trioxide, can be a significant concern.

In addition to sulfur oxides that form during coal combustion, sulfur trioxide may also be produced inadvertently in selective catalytic reduction (SCR) processes downstream of the boiler for controlling NO emissions, or it may be added to the flue gas to enhance the performance of ESP devices used to capture the fly ash. Regardless of its origins, sulfur trioxide may have unintended consequences beyond its interference with mercury removal that affect the performance and profitability of the power plant. These consequences include corrosion of system components and unwanted increases in plume visibility and duration upon discharge from the stack.

To prevent the interference of sulfur oxides with mercury removal by the injected mercury sorbent, a number of prior art solutions have been proposed wherein gross reductions in total sulfur oxide levels are achieved in the gas phase. Nearly all of these solutions rely upon bulk injections of alkaline or other reactive agents into the flue gas to react chemically with the sulfur oxides, forming salt particulates in the gas phase which do not usually interfere with mercury adsorption by the sorbent. In some cases, the agent is injected as a dry solid (Dry Sorbent Injection (DSI)), while in other methods an aqueous solution of the agent is injected, which rapidly devolatizes at the temperature of injection to form a very fine, dry powder with even higher reactivity toward sulfur oxides in the duct. For example, trona, a naturally-occurring mixture of sodium carbonate and sodium bicarbonate, is a commercially-available material found to be effective in controlling sulfur oxides when injected into flue gas streams as a dry reactant.

Other alkaline agents, such as calcium oxide (lime), calcium hydroxide (slaked lime), calcium carbonate (limestone), magnesium carbonate (dolomite), magnesium hydroxide, magnesium oxide, and sodium carbonate are also utilized to control sulfur oxide emissions. Solution injection of such agents is represented by Codan's SBS Injection™ technology, which uses an aqueous solution of the chemical reductants sodium bisulfite and sulfite, and is more selective and effective for sulfur trioxide removal. Alternatively, solutions of sodium carbonate, bicarbonate, or hydroxide or thiosulfate can also be used. However, all of these materials and methods suffer disadvantages in that relatively large amounts of the agent must be used for effective control and, more importantly, separate injection systems must be installed independent of mercury sorbent injection, adding cost and complexity to their application. In the case of alkali-based agents, a further disadvantage is found in the negative impact of such materials on the properties of the fly ash collected for subsequent sale to the cement and concrete industry. Although this disadvantage is avoided by using alkaline earth-based agents, these agents generally impart an unwanted increase in resistivity to the ESP, while the alkali-based agents usually have minimal impact on ESP operation.

Where alkaline or other $SO_x$ reactive agents have been incorporated into the pore structure of the sorbents themselves, the intent has been uniformly the removal of the sulfur compounds and not the removal of mercury in the presence of such compounds. Numerous other examples of activated carbons and other sorbents that incorporate $SO_x$-reactive materials within the body of the sorbent have been reported, but none appear to advance the art of mercury removal since they are neither directed to that purpose nor are they likely to offer a preferred solution since major portions of the pore structure available for mercury adsorption are configured preferentially for sulfur oxide removal.

There is a need to provide dry sorbent compositions for mercury removal in flue gas streams containing high concentrations of sulfur oxides, especially sulfur trioxide, that do not depend on the independent injection of alkaline or other reactive agents elsewhere in the system for effective mercury removal, and are inherently effective in a single injection mode. Where such alkaline or reactive agents are used as part of the dry sorbent compositions, there is a further need to limit the impact of these agents on balance-of-plant operations by using only what may be necessary to enhance mercury removal locally at the point of sorbent injection, as well as to avoid incorporation within the body of the porous sorbent to afford increased opportunity for mercury removal. Where independent injection of said alkaline or reactive agents may yet be necessary, there is also a need to reduce the amount of such agents that might otherwise be used, consistent with effective mercury removal and marginal impacts on balance of plant issues.

SUMMARY OF THE INVENTION

Various embodiments are directed to a composition including a a porous absorptive material, a source of halogen and a source of nitrogen wherein said source of nitrogen has an oxidation state of –3 and said composition having a particle size of less than 12 µm. In some embodiments, the source of nitrogen may be selected from the group consisting of ammonium, ammonia, amines, amides, imines, quaternary ammonium and the like, and in other embodiments, the composition may have a mean particle diameter of less than about 7 µm. In still other embodiments, the at least one agent is ammonium bromide. The porous mercury adsorptive material may be any of a carbonaceous char, activated carbon, reactivated carbon, zeolite, silica, silica gel, alumina clay, or a combination thereof. In some embodiments, the porous mercury adsorptive material has a surface area of at least about 300 m²/g, and in other embodiments, the porous mercury adsorptive material further comprises a hydrophobicity enhancement agent. In particular embodiments, composition may have a halide concentration of greater than 0.15 equivalents per 100 grams of the composition, and in certain embodiments, the at least one agent is from about 15 wt. % to about 70 wt. % of the composition, and particular embodiments, the composition may be a dry admixture.

Certain embodiments are directed to a sorbent for the removal of mercury from flue gas streams including a dry admixture of a porous mercury adsorptive material and at least one agent selected from the group consisting of ammonium halides, amine halides quaternary ammonium halides, and combinations thereof. In some embodiments, the dry admixture may have a mean particle diameter of less than about 12 µm. In other embodiments, the dry admixture may have a mean particle diameter of less than about 10 µm, and in still other embodiments, the dry admixture has a mean particle diameter of less than about 7 µm.

The porous mercury adsorptive material of embodiments may be a carbonaceous char, activated carbon, reactivated carbon, zeolite, silica, silica gel, alumina clay, or a combination thereof, and in some embodiments, the porous mercury adsorptive material may have a surface area of at least about 300 m²/g. In certain embodiments, the porous mercury adsorptive material may further include a hydrophobicity enhancement agent including, but not limited to, elemental halogens fluorine salts, organo-fluorine compounds, fluorinated polymers, and combinations thereof. In other embodiments, the porous mercury adsorptive material may further include one or more oxidants such as, but not limited to, halogen salts, and in some embodiments, the oxidant may be greater than or equal to about 0.15 equivalents per 100 grams of the dry admixture.

In particular embodiments, the at least one agent may be ammonium bromide. In some embodiments, the at least one agent may be about 10 wt. % or greater of the dry admixture. In other embodiments, the at least one agent may be about 15 wt. % or greater of the dry admixture, and in still other embodiments, the at least one agent may be about 30 wt. % or greater of the total sorbent. In some embodiments, the at least one agent may be from about 15 wt. % to about 70 wt. % of the dry admixture. In other embodiments, the at least one agent may be from about 15 wt. % to about 50 wt. % of the dry admixture, and in still other embodiments, the at least one agent may be from about 20 wt. % to about 50 wt. % of the dry admixture. In certain embodiments, the at least one agent may be from about 20 wt. % to about 40 wt. % of the dry admixture. In further embodiments, the at least one agent may be greater than or equal to about 0.15 equivalents per 100 grams of the dry admixture.

Other embodiments are directed to methods for preparing a sorbent for the removal of mercury from flue gas streams including the steps of co-milling a dry porous mercury adsorptive material and at least one dry agent selected from the group consisting of ammonium halides, amine halides, and quaternary ammonium halides to form a dry admixture having a mean particle diameter of less than or equal to about 12 µm, and in particular embodiments, the porous mercury adsorptive material and at least one agent are not physically associated in the dry admixture. In some embodiments, co-milling may be performed until the dry admixture has a mean particle diameter of less than about 10 µm, and in other embodiments, co-milling may be performed until the dry admixture has a mean particle diameter of less than about 7 µm. The porous mercury adsorptive material and various agents may be any of those agents provided in the above embodiments, and the admixture may include any amount of the components as described above.

Still other embodiments include a method for removing mercury from flue gas streams containing sulfur trioxide ($SO_3$) including the steps of injecting into the flue gas stream a dry admixture of a porous mercury adsorptive material and at least one dry agent selected from the group consisting of ammonium halides, amine halides, and quaternary ammonium halides, wherein the dry admixture has a mean particle diameter of less than or equal to about 12 µm. In some embodiments, the dry porous mercury adsorptive material and the at least one dry agent may be combined to form a dry admixture prior to being injected into the flue gas stream, and in other embodiments, the dry porous mercury adsorptive material and the at least one dry agent may be injected in to the flue gas stream separately. The porous mercury adsorptive material and various agents may be any of those agents described in the above embodiments, and the admixture may include any amount of the components as described above.

DESCRIPTION OF DRAWINGS

Not applicable.

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

Embodiments of the invention are directed to mercury sorbents having enhanced mercury removal capabilities in flue gas streams containing high concentrations of acid gases. In various embodiments, the mercury sorbent may include a mercury adsorptive material and a acid gas suppression agent. In some embodiments, the mercury adsorptive material may be an adsorptive material, such as, a carbonaceous char or activated carbon that has been treated with one or more additives that enhance the hydrophobicity of the adsorbent material, and in other embodiments, the mercury adsorptive material may be treated with a mercury adsorption enhancing additive. In certain embodiments, acid gas suppression agent may be any agent having an exceptionally high affinity, selectivity, and rapid kinetics for acid gases such as, for example, hydrochloric acid (HCl), hydrofluoric acid (HF), nitric oxide species ($NO_x$), or sulfur oxide species ($SO_x$). In certain embodiments, the sorbents of the invention may include a porous mercury sorbent and a $SO_x$ suppression agent. Such sorbents may more effectively reduce the concentration of mercury in flue gas streams into which they are added over mercury adsorptive materials alone, in particular, when injected into flue gas streams containing high concentrations of sulfur oxide species.

In general, mercury adsorptive materials such as activated carbon remove carbon adsorb mercury with less efficiency in flue gas streams having high concentrations of acid gases and, in particular, sulfur oxide species, $SO_x$ such as, $SO_3$ and/or $SO_2$, and other acid gases. Sulfur trioxide, $SO_3$, is strongly adsorbed by activated carbon. Sulfur dioxide, $SO_2$, although less strongly adsorbed, can be oxidized to sulfur trioxide by oxygen in the flue gas in the presence of catalytic sites on the adsorbent surface. The overall effect of adsorption of these sulfur oxides precludes or strongly interferes with the adsorption of mercury from the flue gas.

The adsorption of sulfur oxide species may be further enhanced in the presence of water, which is commonly present in flue gas steams. Accordingly, increasing the inherent hydrophobicity of the adsorbent surface or making it less receptive to moisture adsorption can limit the formation and retention of sulfur species on the carbon surface, preserving more of the adsorption pore volume for mercury removal. Thus, various embodiments of the invention include hydrophobic mercury adsorptive materials. As used herein "hydrophobic" describes the forces driving a solute out of water (or other polar solvent) and the tendency for collection on surfaces or in non-polar solvents. In some embodiments, the hydrophobicity of the adsorbent may be enhanced to reduce $SO_x$ adsorption to the adsorptive material, and in other embodiments, the porous regions of the adsorptive material may be treated such that the kinetics of mercury removal are enhanced relative to the kinetics of sulfur oxide removal.

The mercury adsorptive material of the sorbent composition of various embodiments may include any material having an affinity for mercury. For example, in some embodiments, the mercury adsorptive material may be a porous sorbent having an affinity for mercury including, but not limited to, activated carbon, reactivated carbon, zeolite, silica, silica gel, clay, and combinations thereof, and in particular embodiments, the mercury adsorptive material may be activated carbon.

The mercury adsorptive material may have any mean particle diameter (MPD). For example, in some embodiments, the MPD of the mercury adsorptive material may be from about 0.1 μm to about 100 μm, and in other embodiments, the MPD may be about 1 μm to about 30 μm. In still other embodiments, the MPD of the mercury adsorptive material may be less than about 15 μm, and in some particular embodiments, the MPD may be about 2 μm to about 10 μm, about 4 μm to about 8 μm, or about 5 μm or about 6 μm. In certain embodiments, the mercury adsorptive materials may have an MPD of less than about 12 μm, or in some embodiments, less than 7 μm, which may provide increased selectivity for mercury oxidation.

The mercury adsorptive materials of various embodiments may have an inherent hydrophobic character. For example, while activated carbon is inherently hydrophobic to the extent that it is wet more readily by organic solvents than by water, all activated carbons are not completely hydrophobic, and certain portions of the surface of activated carbons may exhibit partially hydrophilic characteristics. In some embodiments, the feedstock used to prepare the mercury adsorptive material may be selected from materials having fewer carbon-oxygen surface groups, which provide fewer active sites for carbon self-oxidation and fewer sites for oxidation of sulfur dioxide to sulfur trioxide. Such materials may be selected using, for example, a high peroxide index as described in U.S. Pat. Nos. 6,238,641 and 6,514,906, which are hereby incorporated by reference in their entireties.

In other embodiments, the mercury adsorptive material may be treated to enhance the hydrophobicity of the adsorptive materials with, for example, one or more hydrophobicity enhancement agents that impede the adsorption and transport of water or other treatments of the sorbent that achieve similar results. Embodiments are not limited to the type of treated mercury adsorptive material or the means by which the mercury adsorptive material has been treated with a hydrophobicity enhancement agent. For example, in some embodiments, the mercury adsorptive material may be treated with an amount of one or more elemental halogen that can form a permanent bond with the surface. The elemental halogen may be any halogen such as fluorine (F), chlorine (Cl), or bromine (Br), and in certain embodiments, the elemental halogen may be fluorine (F). In other embodiments, the mercury adsorptive material may be treated with a hydrophobicity enhancement agent such as a fluorine salt, organo-fluorine compound, or fluorinated polymer, such as, TEFLON®. In such embodiments, treatment may be effectuated by grinding the mercury adsorptive material with the organo-fluorine compound or fluorinated polymer. In still other embodiments, carbon sorbents used as the mercury adsorptive material may be treated with mineral acids such as but not limited to, hydrochloric acid, nitric acid, boric acid, and sulfuric acid, under high temperature, e.g., greater than about 400° C. or greater than 600° C. or greater than 800° C. The concentration of the acid is not critical to such treatments and concentrations as low as 1.0 percent by weight or less may be used. Without wishing to be bound by theory, such treatment may enhance hydrophobicity and decreased activity for the catalytic oxidation of sulfur dioxide to sulfuric acid in the presence of oxygen and water. Evidence of such treatments can be found in a high contact pH and a reduced tendency for the carbon alone to decompose hydrogen peroxide when compared to the same carbon without such treatments.

In still other embodiments, any of the adsorptive materials described above may be treated with one or more mercury removal agents or oxidizing agents that enhance mercury adsorption. For example, in some embodiments, the mercury removal agent may be a halogen salt including inorganic halogen salts, which for bromine may include bromides, bromates, and hypobromites, for iodine may include iodides, iodates, and hypoiodites, and for chlorine may be chlorides, chlorates, and hypochlorites. In certain embodiments, the inorganic halogen salt may be an alkali metal or an alkaline earth element containing halogen salt where the inorganic halogen salt is associated with an alkali metal such as lithium, sodium, and potassium or alkaline earth metal such as magnesium, and calcium counterion. Non-limiting examples of inorganic halogen salts including alkali metal and alkali earth metal counterions include calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, ammonium chloride, ammonium bromide, ammonium iodide, potassium tri-chloride, potassium tri-bromide, potassium tri-iodide, and the like. In particular embodiments, the halogen salt may be a bromine salt, such as calcium bromide ($CaBr_2$). In such embodiments, the oxidant content may be near to or above about 0.15 equivalents per 100 grams of absorptive material, wherein one equivalent of oxidant is defined as the amount required to react with one mole of electrons in a redox reaction.

In various embodiments, treatment of the mercury adsorptive material with a halogen salt or other mercury removal agent may be effectuated by grinding the mercury adsorptive material with the halogen salt or other mercury removal agent. For example, in some embodiments, increased selectivity for mercury adsorption over sulfur trioxide adsorption may be provided by co-milling activated carbon with a halide salt to an MPD of less than about 10 μm or less than about 7 μm. Although not wishing to be bound by theory, the small MPD may improve the selectivity of mercury adsorption as the halide effectively oxidizes the mercury and the alkalinity interferes with the adsorption of the sulfur trioxide.

Certain embodiments of the invention include methods for treating an adsorptive material by grinding the adsorptive material with a halogen salt or other mercury removal agent and an organo-fluorine compound or fluorinated polymer. For example, in some embodiments, the mercury adsorptive material may be treated with both a halogen salt or other mercury removal agent and a solid hydrophobicity enhancement agent such as an organo-fluorine compound or a fluorinated polymer, and in such embodiments, the adsorptive material may be co-ground with both agents.

In some embodiments, mercury removal may be further enhanced by combining the adsorptive materials described above with one or more secondary agents having high affinity, high selectivity, and rapid kinetics for acid gas removal, which may be collectively referred to herein as "acid gas suppression agents" or "acid gas suppressors." In some embodiments, the acid gas agents may not be physically incorporated into and within the adsorptive material itself. Rather, the acid gas agents may be provided as a separate component of the mercury sorbent that is blended with the adsorptive agent; therefore, the maximum pore space for mercury reaction and adsorption can be maintained on the adsorptive material. In certain embodiments, the acid gas suppression agents may have high affinity, high selectivity, and rapid kinetics for sulfur reactive species such compositions are referred to herein as "$SO_x$ suppression agents" or "$SO_x$ suppressors." The resulting mercury sorbent thus includes an adsorptive material and one or more $SO_x$ suppression agents. Any type of $SO_x$ suppression agent known in the art may be used in the mercury sorbent of various embodiments. For example, the $SO_x$ suppression agent may be an oxidizing agent, alkaline agent, dual-function agent having both alkalinity and oxidation capabilities, or adsorptive agent treated to specifically adsorb sulfur oxides.

In some embodiments, the acid gas or $SO_x$ suppression agent may be an alkaline agent. Numerous alkaline agents are known in the art and currently used to remove sulfur oxide species from flue gas and any such alkaline agent may be used in the invention. For example, in various embodiments, the alkaline additive may be alkali oxides, alkaline earth oxides, hydroxides, carbonates, bicarbonates, phosphates, silicates, aluminates, and combinations thereof, and in certain embodiments, the alkaline additive may be calcium carbonate ($CaCO_3$; limestone), calcium oxide (CaO; lime), calcium hydroxide ($Ca(OH)_2$; slaked lime); magnesium carbonate ($MgCO_3$; dolomite), magnesium hydroxide ($Mg(OH)_2$), magnesium oxide (MgO), sodium carbonate ($Na_2CO_3$), sodium bicarbonate ($NaHCO_3$), trisodium hydrogendicarbonate dihydrate ($Na_3H(CO_3)_2.2H_2O$; trona), and combinations thereof In various embodiments, the alkalinity agent may be provided at a concentration greater than or equal to about 0.15 equivalents per 100 grams of absorptive material, wherein one equivalent of the alkaline agent is defined as the amount required to produce one mole of hydroxyl ions or to react with one mole of hydrogen ions. In particular embodiments, such alkaline agents may have a relatively high surface area such as, for example, above 100 $m^2/g$ for neat materials. High surface area materials may provide improved kinetics and capabilities for acid gas or $SO_x$ mitigation while complementing halogen compounds and other added oxidants to provide oxidation of elemental mercury. Because alkaline agents are highly polar materials that may associate and bond with water, in various embodiments, alkaline agents may be combined with the primary mercury sorbent as a physical admixture and may not generally be present on the sorbent surface or contained within the sorbent pore structure.

In further embodiments, the acid gas or $SO_x$ suppression agent is a dual-function agent having both acid gas adsorption capacity and mercury oxidation activity on the same agent. In some embodiments, the dual function agent may be a readily dissociable additive with an oxidizing component and alkaline component. Examples of such agents include a non-metal cation and a halide. In some embodiments, such compounds may include a halogen and a source of nitrogen having an oxidation state of −3. Various such nitrogen sources are known in the art and can include, for example, ammonium, ammonia, amines, amides, imines, quaternary ammonium, and the like. In certain embodiments, the agent may be, for example, ammonium halide, such as, ammonium iodide, ammonium bromide, or ammonium chloride, an amine halide, a quaternary ammonium halide, or an organo-halide and combinations thereof. These agents can be combined with a porous mercury adsorbent to provide the compositions and sorbents of the invention.

In such embodiments, an ammonium halide such as, for example, ammonium bromide ($NH_4Br$), can react with the sulfur oxides in the flue gas to form ammonium sulfate (($NH_4)_2SO_4$) or ammonium sulfite (($NH_4)_2SO_3$) and free bromine. The bromine liberated by this reaction is not substantially adsorbed by the activated carbon and is available to oxidize mercury in the flue gas, which is readily adsorbed by adsorptive material, although secondary oxidation pathways such as those afforded by the Deacon reaction may also be effective. Without wishing to be bound by theory, these dual-function additives may have higher vapor pressures and lower decomposition temperatures compared to alkali or alkaline earth metal halide salts that are commonly provided with mercury adsorbents, which are provided solely for oxidation of mercury. Thus, the dual-function additives may provide effective mercury oxidation together with improved kinetics for $SO_x$ suppression and sulfur trioxide adsorption.

Acid gas or $SO_x$ suppression agents having a dual-function agent may be prepared by any method known in the art. For example, in some embodiments, one or more ammonium halide, amine halide, or quaternary ammonium halide may be prepared independently and either combined with a mercury adsorptive agent or combined with an adsorptive material such as, for example, activated carbon, under conditions that do not allow the dual-function agent to impregnate and bind to the adsorptive agent. In other embodiments, an ammonium, amine, or quaternary ammonium containing compound may be combined with an adsorptive material simultaneously with an elemental halogen or decomposable halogen compound. In particular embodiments, the acid gas or $SO_x$ suppression agent may include a dual-function agent having a surface area greater than about 50 $m^2/g$ or greater than about 100 $m^2/g$ for the neat materials. In particular embodiments, the dual-function agent may be provided at a concentration of greater than or equal to about 0.15 equivalents per 100 grams of absorptive material based on either the oxidant or alkalinity contributions. In various embodiments, the dual function agents such as ammonium halides, amine halides, or quaternary ammonium halides may be combined with the primary mercury sorbent as a dry physical admixture and may not generally be present on the sorbent surface or contained within the sorbent pore structure.

The acid gas or $SO_x$ suppression agent is provided in the mercury sorbent of various embodiments to suppress acid gases, such as, hydrochloric acid, hydrofluoric acid, nitric oxide species, or sulfur dioxide and sulfur trioxide adsorption to the adsorptive material which would reduce the adsorption of mercury to the adsorptive material. The adsorptive material and the acid gas or $SO_x$ suppression agent may be combined in any ratio which achieves suppression of acid gas and $SO_x$ species while providing sufficient mercury removal. For example, in some embodiments, the adsorptive material to acid gas or $SO_x$ suppression agent ratio may be from about 1:1, about 1:5, about 1:10, about 1:25, about 1:50, about 75:1, or about 1:100. In other embodiments, the adsorptive material to acid gas or $SO_x$ suppression agent ratio may be from about 5:1, about 10:1, about 25:1, about 50:1, about 75:1, or about 100:1. In other embodiments, the acid gas or $SO_x$ suppression agent may make up about 10 wt. % or greater or about 15 wt. % or greater of the total sorbent, and in still other embodiments, the acid gas or $SO_x$ suppression agent may make up about 30 wt. % or greater, 40 wt. % or greater, 50 wt. % or greater, 60 wt. % or greater, or 70 wt. % or greater of the total sorbent. In other embodiments, the dual function agents may be combined with other agents such as, for example, halide salts, halide metal salts, alkaline agents, and the like to prepare a composition or sorbent encompassed by the invention.

In particular embodiments, the sorbent may include a mercury adsorptive material such as activated carbon or treated activated carbon and an agent such as ammonium halide, amine halide, or quaternary ammonium halide, for example, ammonium bromide. In some such embodiments, the ammonium bromide may be provided about 10 wt. % or greater or about 15 wt. % or greater, about 20 wt. % or greater, about 25 wt. % or greater, about 30 wt. % or greater, about 40 wt. % or greater of the total sorbent. In other embodiments, the sorbent may include from about 10 wt. % to about 70 wt. %, about 10 wt. % to about 60 wt. %, or about 10 wt. % to about 50 wt. % $SO_x$ suppression or about 15 wt. % to about 70 wt. %, about 15 wt. % to about 60 wt. %, or about 15 wt. % to about 50 wt. % $SO_x$ suppression agent or about 20 wt. % to about 70 wt. %, about 20 wt. % to about 60 wt. %, or about 20 wt. % to about 50 wt. % $SO_x$ suppression agent. Without wishing to be bound by theory, improved acid gas and $SO_x$ suppression may allow for improved mercury adsorption by the mercury adsorptive agent, and increasing the concentration of the acid gas or $SO_x$ suppression agent, and in particular a ammonium halide, amine halide, or quaternary ammonium halide such as, for example, ammonium bromide, may improve mercury adsorption beyond currently available adsorbents thereby providing a mercury adsorbent that includes, for example, low activated carbon content but that removes mercury from flue gas streams as effectively as high activated carbon content sorbents. Low activated carbon sorbents may provide improved stability when used in, for example, cement manufacturing.

The compositions of various embodiments described above may allow for a higher percentage of active halide and alkaline agents to be included in the injected sorbent. Mercury adsorbents that are impregnated with an additive by treating with an aqueous solution of the additive, for example, commercial brominated carbon sorbents, especially those impregnated with elemental bromine, can only retain a small percentage of the additive on the surface of the adsorbent, and impregnation tends to clog the pores of porous mercury adsorbents reducing the surface area available for mercury adsorption. In contrast, the percentage of active halide and acid gas or $SO_x$ suppression agent in a dry mixture may be greater than about 10 wt. %, greater than about 15 wt. %, greater than about 20 wt. %, or greater than about 30 wt. % and up to about 50 wt. %, up to about 60 wt. %, or up to about 70 wt. % without exhibiting a reduction in mercury adsorption efficiency.

Moreover, the sorbents of various embodiments exhibit improved stability during manufacture, storage, and injection than currently available impregnated sorbents. For example, producing acid gas or $SO_x$ suppression agents having a mean particle diameter of less than about 15 μm or 20 μm using any of the acid gas or $SO_x$ suppression agents described herein is difficult. Moreover, all of the acid gas or $SO_x$ suppression agents are somewhat hygroscopic, and ammonium halide, amine halide, or quaternary ammonium halide acid gas or $SO_x$ suppression agents readily absorb water. Rapid moisture pickup causes substantial re-agglomeration making maintenance of acid gas or $SO_x$ suppression agents at mean particle diameters of less than about 15 µm difficult. Without wishing to be bound by theory, re-agglomeration may be reduced as the result of the mercury adsorbent acting as separators and competing desiccants reducing the amount of moisture in the dry mixture and allowing long term storage and maintenance of acid gas or $SO_x$ suppression agents with mean particle diameters of less than about 12 µm. Reduction in particles size may also provide more rapid and selective kinetics allowing improved synergistic effects.

In addition, at elemental bromine loadings above 10 wt % to 15 wt %, the equilibrium vapor phase concentrations under ambient conditions may rise above safe and acceptable threshold limit values (0.66 mg/m³ TWA; 2.0 mg/m³ STEL), creating problems in handling and use, and $SO_x$ suppression agents such as ammonium halide, amine halide, or quaternary ammonium halide may provide fire retardant properties that reduce self heating and combustion associated with metal halide containing sorbents in which the metal cation can catalyze the oxidation of the carbon.

The adsorptive material and the $SO_x$ suppression agent may be combined by any method. For example, in some embodiments, the adsorptive material and the $SO_x$ suppression agent may be combined by blending or mixing the materials into a single mercury sorbent that can then be injected into a flue gas stream. In other embodiments, combining may occur during use such that the adsorptive material and the $SO_x$ suppression agent may be held in different reservoirs and injected simultaneously into a flue gas stream.

In certain embodiments, the absorptive material and the $SO_x$ suppression agent may be co-milled. For example, in various embodiments, a porous absorptive material and a acid gas or $SO_x$ suppression agent may be combined and co-milled or sized to about the same particle size distribution which in some embodiments, may be a mean particle diameter of less than or equal to about 12 µm less than or equal to about 10 µm, or less than about 7 µm. Without wishing to be bound by theory, reducing the mean particle diameter of the sorbent, combined with localized acid gas or $SO_x$ suppression added to the sorbent, but not contained within the sorbent pore structure, has been found to be surprisingly effective in facilitating rapid and selective mercury adsorption despite sulfur trioxide concentrations that are orders of magnitude higher than the mercury levels in the flue gas. This effect has been shown particularly effective when all of components of the sorbent are combined and co-milled or otherwise sized to a mean particle diameter of less than or equal to about 12 µm. Co-milling may be carried out by any means. For example, in various embodiments, the co-milling may be carried out using bowl mills, roller mills, ball mills, jet mills or other mills or any grinding device known to those skilled in the art for reducing the particle size of dry solids.

The sorbent of such embodiments may include any of the absorptive materials described above, any additive described above, and any acid gas or $SO_x$ suppression agent described above. In certain embodiments, the absorptive material may be an activated carbon or reactivated carbon. In some embodiments, the additive provides rapid ancillary oxidation of elemental mercury in the gas stream such as, for example, a halide compound, and in particular embodiments, the halide compound may be less stable at elevated temperatures than alkali or alkaline-earth metal analogs. In certain embodiments, the $SO_x$ suppression agent may be a dual function agent providing both oxidation and alkalinity such as, for example, ammonium halides, amine halides, and quaternary ammonium halides.

Further embodiments are directed to methods for removing mercury from flue gas by injecting a mercury adsorbent including a mercury adsorptive material and an acid gas or $SO_x$ suppression agent into a flue gas stream. While such compositions may be particularly effective in flue gas streams having high $SO_x$, and in particular, high $SO_3$, concentrations, the sorbents described herein may be used to adsorb mercury in any flue gas streams regardless of the $SO_3$ concentration. For example, the sorbents of various embodiments may be used in flue gas streams having no or extremely low $SO_3$ content or flue gas streams containing high concentrations of other acid gases such as HCl, HF, or $NO_x$ species. In some embodiments, the mercury adsorptive material and the acid gas or $SO_x$ suppression agent may be combined prior to injection into the flue gas stream by, for example, mixing or blending, the mercury adsorptive material with the acid gas or $SO_x$ suppression agent. In other embodiments, the mercury adsorptive material and the acid gas or $SO_x$ suppression agent may be injected separately into the flue gas stream and combined in the flue gas stream itself. In such embodiments, the acid gas or $SO_x$ suppression agent may adsorb sulfur oxide species such as sulfur trioxide and sulfur dioxide reducing the likelihood that such sulfur oxide species will adsorb to the mercury adsorptive agent. The increased availability for mercury adsorption of surface area on the mercury adsorptive agent may thus increase mercury adsorption.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

Power Plant 1—Three mercury sorbents were tested at a power plant burning a 25% PRB/75% CAPP coal mixture. Sorbent C was prepared by dry-mixing and co-grinding an activated carbon with about 15 wt. % bromide as ammonium bromide to an MPD of about 6 µm. Sorbent B was prepared by dry-mixing and co-grinding an activated carbon with about 15 wt % calcium as calcium oxide and about 5 wt. % bromide as ammonium bromide to an MPD of about 6 µm. These sorbents were compared to a commercial brominated carbon, Sorbent H, having an MPD not less than about 12 µm and containing no more than about 10 wt. % bromide as a bromide salt. The flue gas at this plant contained about 400 to about 600 ppmv sulfur dioxide and about 2 to about 10 ppmv sulfur trioxide at the SCR, selective catalytic reduction, outlet. When injected at the air pre-heater outlet at about 9 to about 9.5 lbs/MMacf the commercial sorbent, Sorbent H, achieved mercury removal levels of about 55% versus about 77% for Sorbent B and 85% for Sorbent C.

Example 2

At Power Plant 2 burning 100% CAPP coal and generating greater than 10 ppmv of sulfur trioxide, Sorbent C, prepared as described in Example 1 was tested for mercury removal against Sorbent H, as described in Example 1. To achieve and maintain mercury removal levels around or above 90%, Sorbent H required injection rates of about 6 lbs/MMacf versus about 2 lbs/MMacf for Sorbent C.

Example 3

At Power Plant 3 where sulfur trioxide levels could be controlled and varied by the deliberate addition of such to the flue gas stream, several mercury removal sorbents were tested at different sulfur trioxide concentrations. Sorbent C was prepared by dry-mixing and co-grinding activated carbon with about 15 wt. % bromide as ammonium bromide to an MPD of about 6 μm. This sorbent was tested against Sorbent M, a commercial brominated carbon sorbent having an MPD not less than about 12 μm and containing not more than about 10 wt. % bromide as a bromide salt. Sorbent C was also tested against Sorbent N, another commercial brominated carbon sorbent believed to be prepared from a lignite-based activated carbon impregnated internally with about 3 to about 6 wt % bromide as sodium bromide and ground to an MPD of about 14 to about 16 μm.

With no sulfur trioxide in the flue gas, Sorbent C gave nearly 100% removal at a sorbent injection rate of 10 lbs/MMacf versus 85% and 76% removal for Sorbents M and N, respectively, at the same injection rate. At 10.3 ppmv sulfur trioxide and the same sorbent injection rate, Sorbent C gave about 94% mercury removal, while commercial brominated sorbents M and N declined to about 65% and 62%, respectively. At 20.3 ppmv of sulfur trioxide and an injection rate of 10 lbs/MMacf, Sorbent C achieved about 78% mercury removal, versus about 53% removal for both of the commercial brominated sorbents M and N. Adding 20 lbs/hr of trona at 25.3 ppmv sulfur trioxide reduced the Sorbent C injection rate to about 7 lbs/MMacf to maintain about 78% mercury removal, while about 8 lbs/MMacf were required for Sorbent M to maintain about 53% mercury removal. The sulfur trioxide levels reported in this example were all measured in front of the air preheater.

Example 4

Power Plant 3—Sorbent C, which includes about 15 wt. % bromine as ammonium bromide dry-mixed and co-ground with activated carbon to an MPD of about 6 μm, and Sorbent D, which includes about 36 wt. % bromine as ammonium bromide dry-mixed and co-ground with activated carbon to an MPD of about 6 μm, were tested against Sorbent N, a commercial brominated carbon sorbent believed to be made from a lignite activated carbon impregnated internally with about 3 to about 6 wt. % bromine as sodium bromide and ground to an MPD of about 14 to about 16 μm. At this coal-fired boiler, sulfur trioxide ($SO_3$) could be added to the flue gas in a controlled manner. At an $SO_3$ concentration of about 10 ppmv, injection rates for each sorbent were increased until 90% mercury removal had been achieved. For Sorbent N, between 50 and 60 lbs/min were required to meet the treatment objective, versus about 20 to about 25 lbs/min for Sorbent C and about 12 to about 15 lbs/min for Sorbent D, demonstrating the value in high $SO_3$ streams of both the higher alkalinity/halide content of the co-ground dual-function additive as well as smaller sorbent mean particle diameters. The sulfur trioxide levels reported in this example were all measured in front of the air preheater.

Example 5

At Power Plant 3—Sorbent C, containing about 15 wt. % bromide as ammonium bromide dry-mixed and co-milled with activated carbon to an MPD of about 6 μm, was tested in a flue gas stream containing about 9 ppmv sulfur trioxide. At an injection rate of about 24 pounds/hour, Sorbent C achieved about 92% mercury removal compared to only about 79% removal at an injection rate of 40 pounds/hour for Sorbent E, a sorbent comparable to Sorbent C in all respects but for a 15 wt. % bromine content provided by sodium bromide instead of ammonium bromide. This example illustrates the added utility for mercury removal afforded by the alkaline component of the dual-function ammonium bromide additive independent of other sorbent parameters.

Example 6

At Power Plant 4—Sorbent C, an activated carbon dry-mixed with about 15 wt. % bromine as ammonium bromide and co-ground to an MPD of about 6 μm, was tested at another power plant against Sorbent N, a commercial brominated carbon sorbent believed to made from a lignite activated carbon impregnated internally with about 3 to about 6 wt. % bromine as sodium bromide ground to an MPD of about 14 to about 16 μm. The flue gas of this boiler contained about 4 ppmv of sulfur trioxide.

When injected at the air pre-heater outlet at a rate of about 6 lbs/MMacf, Sorbent C achieved about 72% mercury removal versus about 42% for Sorbent N, showing the benefits of a smaller sorbent MPD combined with a higher sorbent content of a dual-functioning agent for mercury oxidation and SOx suppression.

Example 7

At Power Plant 5 burning a high percentage of a low-sulfur South American coal with a lower percentage of a high-sulfur domestic coal, about 61% mercury removal was achieved using Sorbent C, including about 15 wt. % bromine as ammonium bromide dry-mixed and co-ground with activated carbon to an MPD of about 6 μm, and injected at the air pre-heater inlet at a rate of about 8 lbs/MMacf for a 70/30 blend, respectively, of the low and high sulfur content domestic coals. The $SO_3$ in the flue gas at the point of injection was measured to be about 8 to about 9 ppmv. Under the same conditions, Sorbent D, a sorbent comparable to Sorbent C but containing about 36 wt. % bromine as ammonium bromide, gave about 81% mercury removal under the same conditions, demonstrating the value of the higher localized alkalinity and halide levels afforded by higher levels of the dual-function additive.

Example 8

Power Plant 5—Three mercury sorbents were tested at Power Plant 5 fired with a coal blend of 20% PRB and 80% of another low-sulfur coal. The sulfur trioxide levels in the flue gas ranged from about 0.5 ppmv to non-detectable. Sorbent C was prepared by dry-mixing and co-grinding an activated carbon with about 15 wt. % bromide as ammonium bromide to an MPD of about 6 μm. Sorbent D was prepared similarly, but contained about 36 wt. % bromide as ammonium bromide. These sorbents were compared to Sorbent M, a commercial brominated carbon having an MPD not less than about 12 μm and a bromide content of not more than about 10 wt. % as a bromide salt. When injected at the air pre-heater inlet, about 8 lbs/MMacf were required to achieve about 90% mercury removal with Sorbent M, versus about 5.5. lbs/MMacf for sorbent C, and about 3 lbs/MMacf for Sorbent D. These data demonstrate the significant performance gains that can be obtained with bromide levels above about 10 wt. % and MPD reductions below about 12 μm, even in flue gas streams with little to no sulfur trioxide.

Example 9

At Power Plant 6 containing 1 to 2 ppmv of $SO_3$ in the flue gas, Sorbent C, containing about 15 wt. % bromine as ammonium bromide dry-mixed and co-ground with activated carbon to an MPD of about 6 μm, was tested against Sorbent M, a commercially-available brominated carbon sorbent having an MPD not less than about 12 μm and containing not more than about 10 wt. % bromine as a bromide salt, and against Sorbent K, a commercially-available brominated carbon sorbent believed to be derived from a lignite or brown coal. When injected at the electrostatic precipitator (ESP) inlet, Sorbent K required an injection rate of about 9 lbs/MMacf to achieve 90% mercury removal, versus about 4.5 lbs/MMacf for Sorbent M and about 2 lbs/MMacf or less for Sorbent C.

Example 10

Power Plant 7—Five mercury sorbents were prepared by dry-mixing and co-grinding activated carbon with either 10 or 20 wt. % bromide as either ammonium or sodium bromide: Sorbent P contained about 10 wt. % bromide as ammonium bromide co-ground to about a 6 μm MPD; Sorbent Q contained about 10 wt. % bromide as ammonium bromide co-ground to about a 16 μm MPD; Sorbent S contained about 10 wt. % bromide as sodium bromide co-ground to about 16 μm MPD; Sorbent R contained about 20 wt % bromide as ammonium bromide co-ground to about a 16 μm MPD; and Sorbent T contained about 20% bromide as ammonium bromide co ground to about 6 μm. Sorbents P, R, Q, and S were tested for mercury removal at injection rates of about 100 lbs/hour under comparable conditions at a Power Plant 7 burning PRB coal and containing little sulfur trioxide in the flue gas.

Sorbents P, R, Q, and S achieved mercury removals of about 77%, 71%, 66%, and 53%, respectively. Sorbent R versus sorbent Q demonstrates the advantages of bromide levels above about 10 wt. % as ammonium bromide at a given MPD, while Sorbent P versus Sorbent Q demonstrates the advantages of an MPD below about 10 μm at a given bromide level. Sorbent Q versus Sorbent S demonstrates the advantages of using ammonium bromide over metal bromide salts, even in flue gas streams containing little sulfur trioxide.

In a second test at Power Plant 7, Sorbent T was compared to Sorbent P and Sorbent Q to determine the amount of sorbent required to remove 90% of the mercury. Sorbent T required approximately 270 lbs/hour, Sorbent P required approximately 320 lbs/hour, and Sorbent Q required over 420 lbs/hour to achieve 90% removal.

While presently preferred embodiments of the invention have been described, it is to be understood that the detailed embodiments are presented for elucidation and not limitation. The invention may be otherwise varied, modified or changed within the scope of the invention as defined in the appended claims.

What is claimed is:

1. A composition comprising dry physical admixture of particles each of the particles having a mean diameter of less than about 12 μm and including each of a porous absorptive material and a source of halo compounds and a source of nitrogen, the source of nitrogen having a nitrogen at an oxidation state of −3.

2. The composition of claim 1, wherein said source of nitrogen is selected from the group consisting of ammonium, ammonia, amines, amides, imines, and quaternary ammonium.

3. The composition of claim 1, wherein the particles have a mean diameter of less than about 7 μm.

4. The composition of claim 1, wherein the source of halo compounds and the source of nitrogen being provided by a single agent.

5. The composition of claim 1, wherein the porous adsorptive material is selected from the group consisting of carbonaceous char, activated carbon, reactivated carbon, zeolite, silica, silica gel, alumina clay, or a combination thereof.

6. The composition of claim 1, wherein the porous adsorptive material has a surface area of at least about 300 $m^2/g$.

7. The composition of claim 1, wherein the composition has a halo compound concentration of greater than 0.15 equivalents per 100 grams of the composition.

8. The composition of claim 1, wherein the composition is a dry admixture.

9. The composition of claim 1, wherein the particles have a mean diameter of less than about 7 μm, and said single agent is selected from the group consisting of ammonium halides, amine halides, and quaternary ammonium halides.

10. The composition of claim 9, wherein the single agent is ammonium bromide at a concentration of 15 wt. % to about 70 wt. % of the composition.

11. A composition for the removal of mercury from flue gas streams comprising a dry physical admixture of:
   a porous mercury adsorptive material; and
   at least one agent selected from the group consisting of ammonium halides, amine halides quaternary ammonium halides, and combinations thereof;
   each of the porous mercury adsorptive material and at least one agent, individually, having a mean particle diameter of less than about 12 μm.

12. The composition of claim 11, wherein the composition has a mean particle diameter of less than about 10 μm.

13. The composition of claim 11, wherein the composition has a mean particle diameter of less than about 7 μm.

14. The composition of claim 11, wherein the porous mercury adsorptive material is selected from the group consisting of carbonaceous char, activated carbon, reactivated carbon, zeolite, silica, silica gel, alumina clay, or a combination thereof.

15. The composition of claim 11, wherein the porous mercury adsorptive material has a surface area of at least about 300 $m^2/g$.

16. The composition of claim 11, wherein the porous mercury adsorptive material further comprises a hydrophobicity enhancement agent.

17. The composition of claim 16, wherein the hydrophobicity enhancement agent is selected from the group consisting of elemental halogens, fluorine salts, organo-fluorine compounds, fluorinated polymers, and combinations thereof.

18. The composition of claim 11, wherein the porous mercury adsorptive material further comprises one or more oxidants.

19. The composition of claim 18, wherein the one or more oxidant is selected from halogen salts.

20. The composition of claim 18, wherein the oxidant comprises greater than or equal to about 0.15 equivalents per 100 grams of the composition.

21. The composition of claim 11, wherein the at least one agent is ammonium bromide.

22. The composition of claim 11, wherein the at least one agent is about 10 wt. % or greater of the composition.

23. The composition of claim 11, wherein the at least one agent is about 15 wt. % or greater of the composition.

24. The composition of claim 11, wherein the at least one agent is about 30 wt. % or greater of the composition.

25. The composition of claim 11, wherein the at least one agent is from about 15 wt. % to about 70 wt. % of the composition.

26. The composition of claim 11, wherein the at least one agent is from about 15 wt. % to about 50 wt. % of the composition.

27. The composition of claim 11, wherein the at least one agent is from about 20 wt. % to about 50 wt. % of the composition.

28. The composition of claim 11, wherein the at least one agent is from about 20 wt. % to about 40 wt. % of the composition.

29. The composition of claim 11, wherein the composition is a dry admixture.

30. A method for preparing a sorbent for the removal of mercury from flue gas streams comprising dry-mixing and co-milling a porous mercury adsorptive material and at least one agent selected from the group consisting of ammonium halides, amine halides, and quaternary ammonium halides to form a dry admixture having a mean particle diameter of less than or equal to about 12 µm.

31. The method of claim 30, wherein the porous mercury adsorptive material and at least one agent are not physically associated in the admixture.

32. The method of claim 30, wherein co-milling is performed until the admixture has a mean particle diameter of less than about 10 µm.

33. The method of claim 30, wherein co-milling is performed until the admixture has a mean particle diameter of less than about 7 µm.

34. The method of claim 30, wherein the porous mercury adsorptive material is selected from the group consisting of carbonaceous char, activated carbon, reactivated carbon, zeolite, silica, silica gel, alumina clay, or a combination thereof.

35. The method of claim 30, wherein the porous mercury adsorptive material has a surface area of at least about 300 $m^2/g$.

36. The method of claim 30, wherein the porous mercury adsorptive material further comprises a hydrophobicity enhancement agent.

37. The method of claim 30, wherein the porous mercury adsorptive material further comprises one or more oxidants.

38. The method of claim 37, wherein the one or more oxidant is selected from halogen salts.

39. The method of claim 37, wherein the oxidant comprises greater than or equal to about 0.15 equivalents per 100 grams of the admixture.

40. The method of claim 30, wherein the at least one agent is ammonium bromide.

41. The method of claim 30, wherein the at least one agent is about 10 wt. % or greater of the admixture.

42. The method of claim 30, wherein the at least one agent is about 15 wt. % or greater of the admixture.

43. The method of claim 30, wherein the at least one agent is about 30 wt. % or greater of the sorbent.

44. The method of claim 30, wherein the at least one agent is from about 15 wt. % to about 70 wt. % of the admixture.

45. The method of claim 30, wherein the at least one agent is from about 15 wt. % to about 50 wt. % of the admixture.

46. The method of claim 30, wherein the at least one agent is from about 20 wt. % to about 50 wt. % of the admixture.

47. The method of claim 30, wherein the at least one agent is from about 20 wt. % to about 40 wt. % of the admixture.

48. The method of claim 30, wherein the at least one agent comprises greater than or equal to about 0.15 equivalents per 100 grams of the admixture.

\* \* \* \* \*